United States Patent
Bishop et al.

(10) Patent No.: US 12,294,580 B1
(45) Date of Patent: May 6, 2025

(54) DIRECTORY SERVICE RECOMMENDER ASSESSMENT AND SCORING

(71) Applicant: CrowdStrike, Inc., Sunnyvale, CA (US)

(72) Inventors: Brenden Thomas Bishop, San Marcos, CA (US); Michael Avraham Brautbar, Wayland, MA (US)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/922,798

(22) Filed: Oct. 22, 2024

(51) Int. Cl.
*H04L 29/06* (2006.01)
*H04L 9/40* (2022.01)

(52) U.S. Cl.
CPC .................... *H04L 63/10* (2013.01)

(58) Field of Classification Search
CPC ......... H04L 63/10; H04L 63/20; H04L 63/14; H04L 63/101; H04L 63/0263; H04L 63/102
See application file for complete search history.

(56) References Cited

U.S. PATENT DOCUMENTS

| | | |
|---|---|---|
| 9,106,687 B1 | 8/2015 | Sawhney et al. |
| 9,582,673 B2 | 2/2017 | Wahl |
| 10,068,099 B1 * | 9/2018 | Fishbeck ................ G06F 16/212 |
| 10,482,268 B1 | 11/2019 | Osborne et al. |
| 11,637,864 B2 * | 4/2023 | Raff .......................... H04L 41/40 726/2 |
| 2023/0254330 A1 * | 8/2023 | Singh ..................... G06F 11/323 726/23 |

FOREIGN PATENT DOCUMENTS

CN 116468237 7/2023

* cited by examiner

*Primary Examiner* — Longbit Chai
(74) *Attorney, Agent, or Firm* — Law Office of Scott P. Zimmerman, PLLC

(57) ABSTRACT

A cybersecurity service assesses, scores, and/or prioritizes activities associated with a directory service. When the directory service is requested to change a directory service assignment, the directory service may first request a verdict from the cybersecurity service. The cybersecurity service may use profiling and/or machine learning to predict directory service assignments. The cybersecurity service may then score and prioritize requests to change/update directory service assignments. Small deviations from predicted directory service assignments, for example, may indicate harmless/normal directory service activity. Larger deviations, though, may indicate abnormal directory service activity. Larger deviations may even indicate malicious directory service activity, such as permission escalation and cyberbreaches. Scoring and prioritization allows for resource allocation and timely mitigations by human experts.

20 Claims, 21 Drawing Sheets

| User ID | Perm A | Perm B | Perm C |
|---------|--------|--------|--------|
| Jake | 1 | 0 | 1 |
| Horacio | 0 | 0 | 0 |
| Becky | 1 | 1 | 1 |
| Yinghao | 0 | 1 | 0 |

| User ID | Perm A | Perm B | Perm C |
|---------|--------|--------|--------|
| Jake    | .98    | .12    | .97    |
| Horacio | .23    | .51    | .05    |
| Becky   | .95    | .92    | .95    |
| Yinghao | .40    | .93    | .11    |

$$M = U \Sigma V^*$$
$m \times n \quad m \times m \quad m \times n \quad n \times n$

DIRECTORY SERVICE RECOMMENDER ASSESSMENT AND SCORING

BACKGROUND

The subject matter described herein generally relates to computers and, more particularly, the subject matter relates to computer security and to detection of abnormal directory service activity.

Cybersecurity threats are always increasing. It seems every day there is another cybersecurity hack that steals passwords, business data, and personal information. One common cybersecurity attack involves a directory service (such as Microsoft's ACTIVE DIRECTORY® service). The directory service manages identities, permissions, and access to network resources. When hackers compromise a user's credentials (such as username and password), the hackers commonly use the credentials to access the directory service. The hackers then elevate the user's permissions and start a data breach.

SUMMARY

A cybersecurity service assesses directory service activities for cybersecurity threats. When a directory service is requested to change a directory service assignment, the directory service may first request a verdict from the cybersecurity service. The cybersecurity service may use profiling and/or machine learning to predict directory service assignments. The cybersecurity service may then score and prioritize requests to change/update directory service assignments. Small deviations from predicted directory service assignments, for example, may indicate harmless/normal directory service activity. Harmless and normal directory service activity may have low scores and priorities, so harmless/normal directory service activity may be quickly implemented. Larger deviations, though, may indicate abnormal directory service activity. Some large deviations, in fact, may even indicate malicious directory service activity, such as nefarious permission escalation and cyberbreaches. Scoring and prioritization may thus be used to allocate computer and human resources and to detect/defeat suspicious directory service activity.

BRIEF DESCRIPTION OF THE SEVERAL VIEWS OF THE DRAWINGS

The features, aspects, and advantages of a directory service recommender assessment and scoring are understood when the following Detailed Description is read with reference to the accompanying drawings, wherein:

FIGS. 9-12 illustrate detailed examples of a machine learned recommender system;

DETAILED DESCRIPTION

Figure 1:
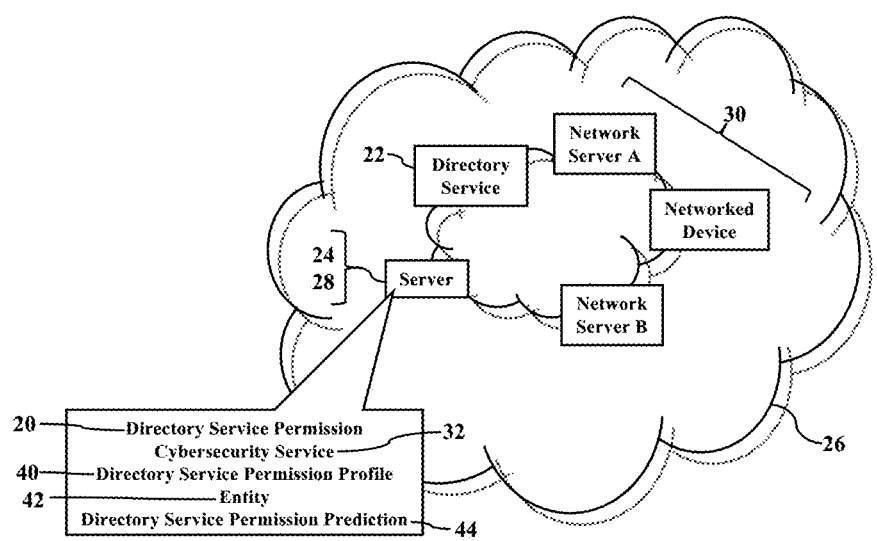
FIGS. 1-6 illustrate some examples of scoring a directory service permission associated with a directory service.

Some examples relate to detection and prioritization of malicious directory service activity. As we know, nearly every day we read of another network hack, computer virus, or other cybersecurity threat. One common cybersecurity attack involves a directory service (such as Microsoft's ACTIVE DIRECTORY® service). The directory service manages identities, permissions, and access to network resources. When hackers compromise a user's credentials (such as the user's username and password), the hackers commonly use the credentials to access the directory service and change/elevate the user's permissions to services and software apps. Once the hackers gain access to services and software, the hackers commence many cyberthreats.

A cybersecurity service, however, protects the directory service. The cybersecurity service, in particular, monitors the directory service for changes, updates, and other directory service activities. When the cybersecurity service detects directory service activity, the cybersecurity service determines whether the directory service activity is normal or abnormal. The cybersecurity service, for example, uses sophisticated profiling and/or machine learning techniques to predict normal directory service activity. If the directory service activity conforms to what is predicted as normal, then the directory service activity may be low scored and low priority. The cybersecurity service may even approve the directory service activity for quick implementation. If, however, the directory service activity does not conform to predicted normal, then the directory service activity may be higher scored and higher priority. Indeed, directory service activity that severely deviates from predicted normal may be nearly immediately terminated or blocked from implementation.

The cybersecurity service scores and prioritizes directory service activities for quick assessment. Urgent, high-priority directory service activities, for example, may be first analyzed, while lesser-priority directory service activities may be deferred. Each score and each priority allows the cybersecurity service to identify directory service activities that may be most harmful and that represent the most urgent cybersecurity threats. Low scoring, low priority directory service activities may be automatically and quickly approved for implementation.

Directory service recommender assessment and scoring will now be described more fully hereinafter with reference to the accompanying drawings. Directory service recommender assessment and scoring, however, may be embodied in many different forms and should not be construed as limited to the examples set forth herein. These examples are provided so that this disclosure will be thorough and complete and fully convey directory service recommender assessment and scoring to those of ordinary skill in the art. Moreover, all the examples of directory service recommender assessment and scoring are intended to encompass both structural and functional equivalents thereof. Additionally, it is intended that such equivalents include both currently known equivalents as well as equivalents developed in the future (i.e., other elements developed that perform the same function, regardless of structure).

FIGS. 1-6 illustrate some examples of scoring a directory service permission 20 associated with a directory service 22. A computer system 24 operates in a cloud computing environment 26. FIG. 1 illustrates the computer system 24 as a server 28. The computer system 24, though, may be another processor-controlled device, as later paragraphs will explain. In this example, the server 28 communicates via the cloud computing environment 26 (e.g., public Internet, private network, and/or hybrid network) with other servers, devices, computers, or other networked members 30 operating within, or affiliated with, the cloud computing environment 26. Some of the networked members 30, as examples, provide the directory service 22. The cloud computing environment 26 provides a digital cybersecurity service 32 on behalf of a service provider.

The server 28 participates in the digital cybersecurity service 32. The server 28, for example, receives the directory service permission 20 associated with the directory service 22. The server 28 then provides the cybersecurity service 32 by analyzing and scoring the directory service permission 20. While the directory service permission 20 may originate from remote, internetworked locations, in this example, the directory service permission 20 originates intranetwork from the directory service 22 provided by the cloud computing environment 26. One or more of the networked members 30 provide the directory service 22, and the networked members 30 request the cybersecurity service 32 when a new/different/changed directory service permission 20 is determined. The new/different/changed directory service permission 20 is routed or forwarded to the server 28 for analysis.

The server 28 is programmed to provide at least a portion of the cybersecurity service 32. The server 28, for example, compares the directory service permission 20 to a directory service permission profile 40. The directory service permission profile 40 describes predicted directory service permissions for different entities 42. That is, the directory service permission profile 40 may store or describe directory service permission predictions 44 associated with the different entities 42. Each entity 42 may be an individual user, a group of users, a single computer/device, a groups of computers/devices, software applications, or even an organization and/or service. Whatever the entity/entities 42, the directory service permission profile 40 describes what directory service permissions are predicted for each entity 42. So, when the server 28 receives the new/different/changed directory service permission 20, the server 28 is programmed to compare the directory service permission 20 to what is predicted by the directory service permission profile 40.

Figure 2:
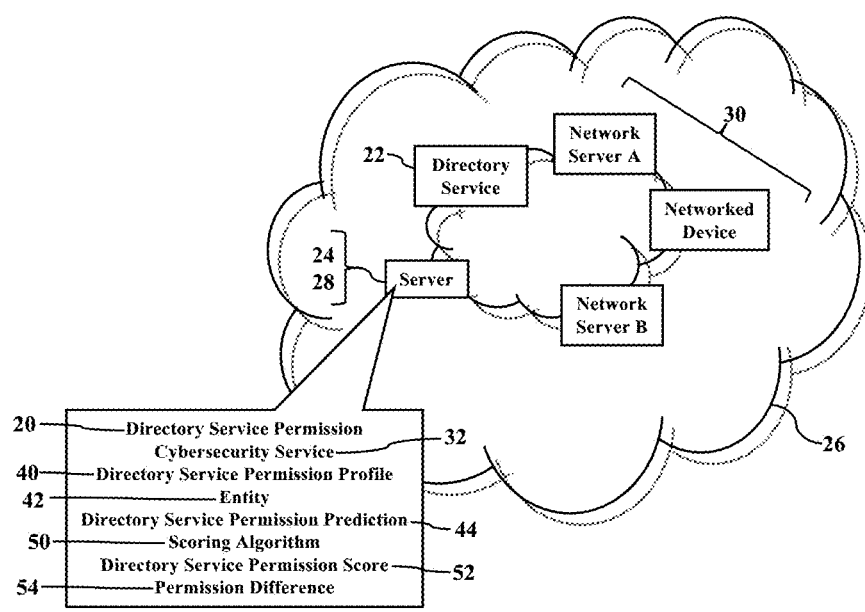

As FIG. 2 illustrates, the server 28 may score the directory service permission 20. The server 28, for example, is programmed to execute a scoring algorithm 50 that generates a directory service permission score 52. There are many different scoring algorithms, and the scoring algorithm 50 may be chosen to suit cost, performance, or other objectives. Whatever the scoring algorithm 50, the server 28 computes the directory service permission score 52 based on how well the new/different/changed directory service permission 20 compares to the directory service permission predictions 44. Again, while there are many different scoring schemes, FIG. 2 illustrates a simple example of differential ranges. The server 28, for example, generates the directory service permission score 52 by determining a permission difference 54 between the directory service permission 20 and the directory service permission prediction 44. Simply put, the permission difference 54 measures how well the new/different/changed directory service permission 20 and the directory service permission prediction 44 agree or disagree. If the permission difference 54 is small or low, then perhaps the directory service permission 20 and the directory service permission prediction 44 have nearly equal values and strongly agree. The directory service permission 20, in other words, resembles or matches what is predicted by the directory service permission profile 40. The directory service permission score 52 may thus have a value that represents this agreement. Conversely, if the permission difference 54 is large or high, then perhaps the directory service permission 20 and the directory service permission prediction 44 have unequal values and strongly disagree. The directory service permission 20 thus does not resemble what is predicted by the directory service permission profile 40. The directory service permission score 52 may thus have a different value that represents this disagreement.

Figure 3:
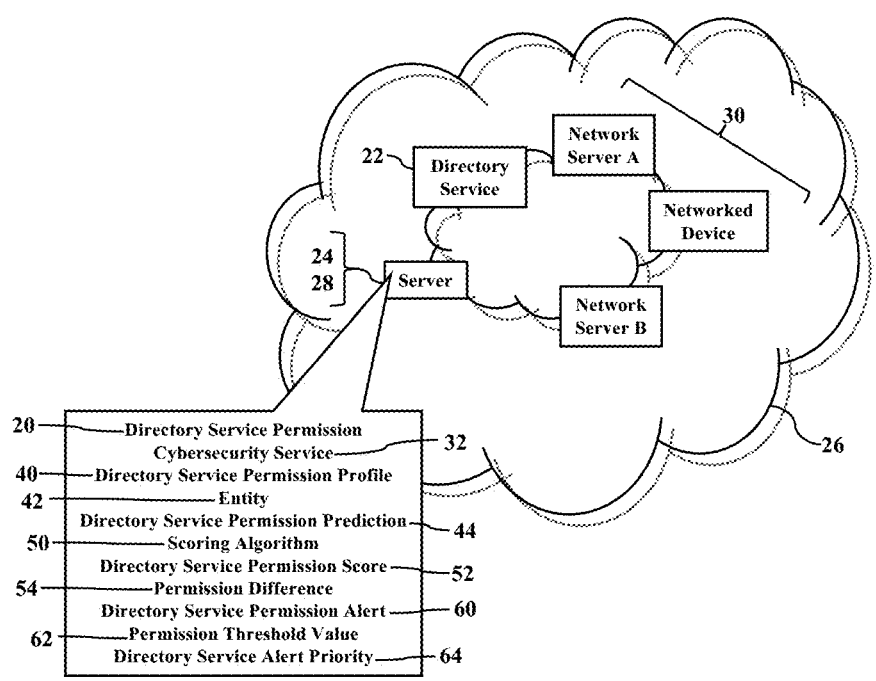

As FIG. 3 illustrates, the server 28 may generate a directory service permission alert 60. After the server 28 scores the new/different/changed directory service permission 20 (i.e., by generating the directory service permission score 52), the server 28 may be programmed to notify others of the directory service permission 20. The server 28, for example, generates the directory service permission alert 60 to describe the directory service permission 20. While the directory service permission alert 60 may have whatever content is desired, the directory service permission alert 60 preferably describes the directory service 22, the entity 42, and the directory service permission 20. The directory service permission alert 60, in other words, may particularly identify the entity 42 and the requested new/updated/changed directory service permission 20. The directory service permission alert 60, however, may also identify the directory service permission prediction 44 and/or the directory service permission score 52. Indeed, the server 28 may further prioritize the directory service permission alert 60 and/or the directory service permission 20 based on the directory service permission score 52. There are many different permission prioritization schemes, and the server 28 may implement whatever prioritization scheme suits cost, performance, or other objectives. When the server 28 computes the permission difference 54 between the directory service permission 20 and the directory service permission prediction 44, the server 28 may compare the permission difference 54 to one or more permission threshold values 62. Each permission threshold value 62 may thus represent a different directory service permission score 52. Moreover, each permission threshold value 62 may be associated with a corresponding directory service alert priority 64. So, when the server 28 determines the permission difference 54, the server 28 may also determine the directory service permission score 52 and the directory service alert priority 64. The server 28 may thus send the directory service permission alert 60, and the directory service permission alert 60 is prioritized according to the directory service alert priority 64.

Figure 4:
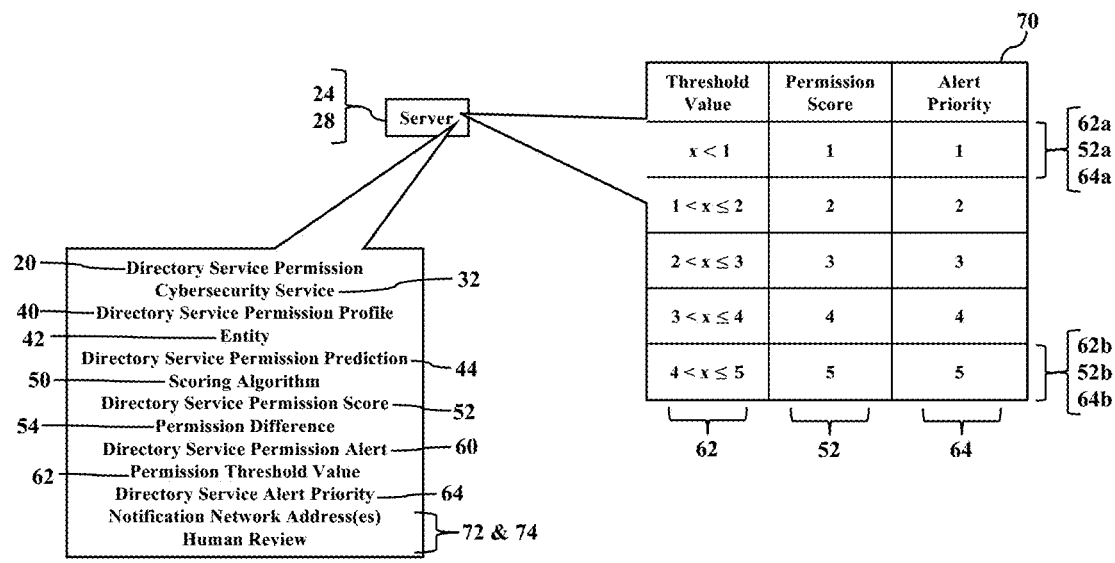

FIG. 4 illustrates a simple alert scheme. FIG. 4 illustrates a directory service scoring table 70 that the server 28 may use to determine the directory service permission score 52 and the directory service alert priority 64. The directory service scoring table 70 maps, relates, or otherwise associates different permission threshold values 62 to their corresponding directory service permission scores 52 and directory service alert priorities 64. So, when the server 28 determines the permission difference 54, the server 28 may compare the permission difference 54 to the permission threshold values 62. If the numerical/rank value of the permission difference 54 satisfies one of the permission threshold values 62, then the server 28 performs a lookup for the corresponding directory service permission score 52 and directory service alert priority 64. Let's assume, for example, that the cybersecurity service 32 operates using numbers 1-5. The cybersecurity service 32, of course, may operate with more complicated numerical values, but numerical ranges 1-5 are easy to understand. If the permission difference 54 (between the directory service permission 20 and the directory service permission prediction 44) is less than the permission threshold value 62a of one (1), then the directory service scoring table 70 identifies one (1) as the directory service permission score 52a and the lowest directory service alert priority 64a of one (1). Simply put, because the permission difference 54 is only one (1), then the directory service permission 20 mostly or strongly agrees with the directory service permission prediction 44. The directory service permission 20, in other words, agrees with what is predicted/expected by the directory service permission profile 40. If the permission difference 54, however, exceeds the permission threshold value 62b of four (4), then the directory service scoring table 70 identifies five (5) as the directory service permission score 52b and the highest directory service alert priority 64b of five (5). Simply put, because the permission difference 54 is within the greatest range of values (e.g., 4-5), then the directory service permission 20 mostly or strongly disagrees with the directory service permission prediction 44. The directory service permission 20, in other words, is not what is predicted nor expected by the directory service permission profile 40. FIG. 4 also illustrates other, intermediate permission threshold values 62 and their corresponding directory service permission scores 52 and alert priorities 64.

The server 28 may thus send the prioritized directory service permission alert 60. After the server 28 generates the directory service permission alert 60, the server 28 may send the directory service permission alert 60 to one or more notification network addresses 72. The directory service permission alert 60 notifies downstream services and/or personnel of the new/different/changed directory service permission 20. The directory service permission alert 60, though, also notifies the recipients of the corresponding directory service permission score 52 and/or the directory service alert priority 64. The recipients may thus use the directory service permission alert 60 to arrange and manage workloads. High scoring, high priority permission alerts 60, for example, may justify urgent computer resources and/or human review 74. Low scoring, low priority permission alerts 60, however, may be queued for later action as resources permit. The server 28 may thus disperse the prioritized directory service permission alert 60 to whatever destinations are desired.

Figure 5:
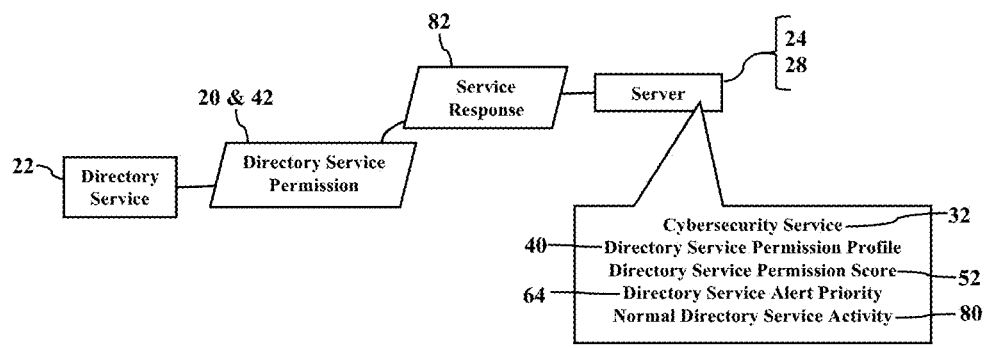

FIG. 5 illustrates permission authorization. When the directory service 22 receives, stores, or is otherwise notified of the new/different/changed directory service permission 20 associated with the entity 42, the directory service 22 may stop, terminate, or pause processing of the directory service permission 20. That is, the directory service 22 may not immediately implement the new/different/changed directory service permission 20. The directory service 22, instead, may suspend processing and request a verdict/decision from the cybersecurity service 32. The server 28 generates the directory service permission score 52 and/or the directory service alert priority 64 (as explained with reference to FIGS. 1-4). The cybersecurity service 32 may thus authorize or deny the new/different/changed directory service permission 20, based on the directory service permission score 52 and/or the directory service alert priority 64. For example, if the directory service permission 20 sufficiently conforms to what is predicted/expected by the directory service permission profile 40 (such as the low score 52 or low priority 64), then the cybersecurity service 32 may categorize the directory service permission 20 as harmless or normal directory service activity 80. The server 28 may thus send a service response 82 back to the directory service 22, and the service response 82 authorizes the new/different/changed directory service permission 20. The cybersecurity service 32 thus authorizes the directory service 22 to resume processing and to implement the new/different/changed directory service permission 20.

Figure 6:
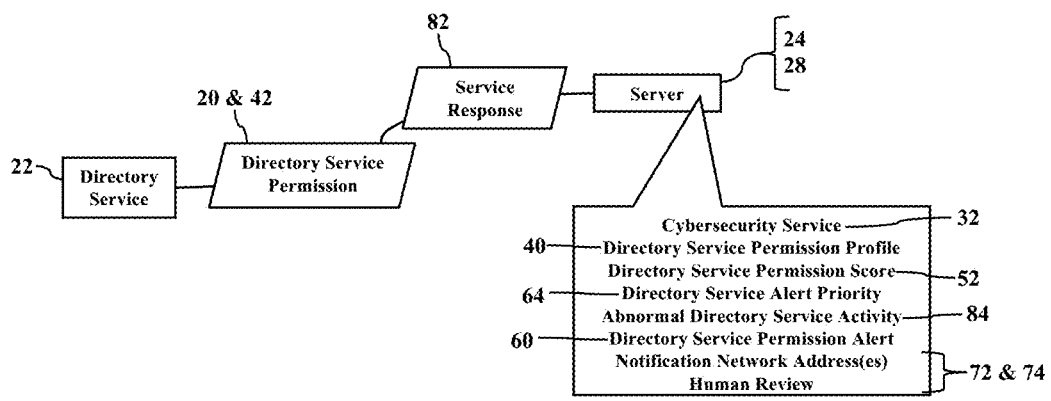

FIG. 6, though, illustrates permission denial. When the directory service 22 pauses or suspends processing and requests the cybersecurity service 32, the cybersecurity service 32 may deny implementation of the new/different/changed directory service permission 20. That is, when the directory service permission 20 fails to conform or sufficiently resemble what is predicted or expected by the directory service permission profile 40 (such as the high score 52 or high priority 64), then the cybersecurity service 32 may categorize the directory service permission 20 as abnormal directory service activity 84. Because the new/different/changed directory service permission 20 is unexpected or dissimilar to the directory service permission profile 40, the server 28 may send the directory service permission alert 60 with high priority 64 to the notification network addresses 72. The server 28 may even queue the new/different/changed directory service permission 20 for the urgent human review 74. Moreover, because the directory service permission 20 is abnormal directory service activity 84, the server 28 may send the service response 82 back to the directory service 22. Here, though, the service response 82 may instruct the directory service 22 to maintain service suspension until the verdict is known (e.g., the human review 74 is completed). The service response 82, however, may instruct the directory service 22 to terminate the attempted new/different/changed directory service permission 20. The cybersecurity service 32 may thus delay or deny abnormal directory service activity 84.

As FIGS. 1-6 illustrate, the cybersecurity service 32 spots malicious permissions activity. The directory service 22 manages entity identities, permissions (such as the directory service permission 20), and access to network resources and workloads. The directory service 22 maintains profiles for each entity 42 (such as the directory service permission profile 40) and centralizes authentication and access control. Microsoft's ACTIVE DIRECTORY® service is one example of the directory service 22. Google's WORKSPACE DIRECTORY®, Apache's DIRECTORY SERVER®, Red Hat's DIRECTORY SERVER®, and Apple's OPEN DIRECTORY® are more examples of the directory service 22. Whatever the directory service 22, though, the cybersecurity service 32 analyzes the directory service permission 20 for suspicious assignments. When the directory service 22 is requested to establish a new, different, or changed directory service permission 20 associated with the entity 42, the directory service 22 may first request the cybersecurity service 32. The cybersecurity service 32 checks the new/different/changed directory service permission 20 against the directory service permission profile 40. If the new/different/changed directory service permission 20 fits what is predicted or expected, then perhaps the new/different/changed directory service permission 20 is low priority and may be approved for implementation. If, however, the new/different/changed directory service permission 20 lies sufficiently outside what is predicted or expected, then perhaps the new/different/changed directory service permission 20 is high priority and requires further investigation (such as the human review 74).

The cybersecurity service 32 greatly simplifies the directory service 22. The directory service 22 manages many different entities 42 (e.g., users, devices, applications, services). Indeed, in a typical company or corporation, there may be hundreds or thousands of employees using/sharing thousands of different computers. Moreover, in today's remote working culture, these hundreds or thousands of employees are signing in from even more locations and networks and requesting access to hundreds of software applications/services. All these different entities 42 are exceptionally difficult to manage. The cybersecurity service 32, though, automates entity and permissions management. When the directory service 22 is requested to change/update information (such as the new/different/changed directory service permission 20), the directory service 22 may first outsource or subcontract the changed/updated information for review by the cybersecurity service 32. The directory service 22 may thus rely on the cybersecurity service 32 for approvals or denials without expensive and time-consuming IT administrative support. The directory service 22 receives a quick and accurate decision, perhaps within seconds or minutes. The highest-scoring, highest-priority changes, of course, may be delayed (such as for the human review 74) to guard against malicious permissions activity.

The cybersecurity service 32 improves computer functioning. The abnormal directory service activity 84 may indicate a cybersecurity data breach is being attempted. The server 28, though, is programmed to detect unusual, unexpected, or unpredictable actions by the directory service 22. When the server 28 detects the different ranges of the abnormal directory service activity 84, the server 28 generates the directory service permission alert 60 to indicate a severity of the abnormal directory service activity 84. Indeed, the server 28 may even block or terminate the most severe new/different/changed directory service permissions 20. Simply put, the functioning of the server 28 is improved by detecting abnormal directory service activity 84 and by blocking cybersecurity data breaches.

Figure 7:
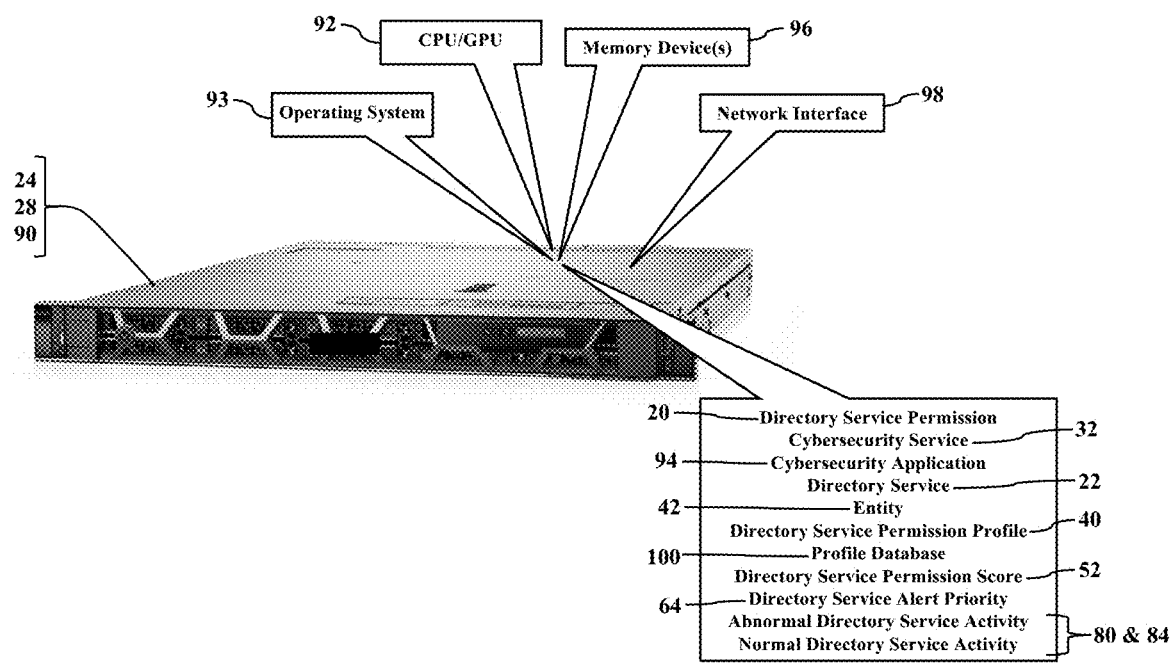
FIG. 7 illustrates more examples of a cybersecurity service.

FIG. 7 illustrates more examples of the cybersecurity service 32. FIG. 7 illustrates the server 28 as a rack server 90, which is commonly installed in many server rooms and server farms. When the directory service 22 receives the request to implement the new/different/changed directory service permission 20, the directory service 22 may send the directory service permission 20 to the cybersecurity service 32 for a deep analysis (as explained with reference to FIGS. 1-6). When the rack server 90 receives the directory service permission 20, the rack server 90 is programmed to provide cybersecurity service 32. The rack server 90, for example, has at least one hardware processor 92 (illustrated as "CPU/GPU") that executes an operating system 93 stored in a memory device 96. The hardware processor 92 also executes a cybersecurity application 94 stored in the memory device 96. The rack server 90 also has network interfaces (illustrated as "NI") 98 to multiple communications networks (such as the cloud computing environment 26 illustrated in FIGS. 1-3), thus allowing bi-directional communications with networked devices. When the rack server 90 receives, or is notified of, the directory service permission 20, the cybersecurity application 94 may be a computer program, instruction(s), or code that instructs or causes the rack server 90 to assess the directory service permission 20. The cybersecurity application 94, for example, causes the rack server 90 to inspect the directory service permission 20 and to read packet header/body data fields or content that specify the entity 42 and the directory service 22. The cybersecurity application 94 may instruct the rack server 90 to identify and/or retrieve the directory service permission profile 40 associated with the entity 42 and the directory service 22. The rack server 90, for example, may query a profile database 100 that stores different directory service permission profiles 40 associated with different entities 42 and with different directory services 22. The cybersecurity service 32, in other words, may service many different customers using different directory service systems (such as Microsoft's ACTIVE DIRECTORY® service, Google's WORKSPACE DIRECTORY®, Apache's DIRECTORY SERVER®, Red Hat's DIRECTORY SERVER®, or Apple's OPEN DIRECTORY®). The cybersecurity service 32 queries the profile database 100 to obtain or use the correct directory service permission profile 40 that is associated with the entity 42. The server 28 may then score and prioritize the directory service permission 20, based on the directory service permission profile 40. The cybersecurity service 32 and the cybersecurity application 94 thus act or function as a directory service assessment engine that ingests directory service data (such as the directory service permission 20) as an input and generates outputs (such as the directory service permission score 52 and/or the directory service alert priority 64). The directory service alert priority 64, as examples, may be a numerical ranking (e.g., 1-5 as explained with reference to FIG. 4) or a categorization (e.g., high, medium, low). Whatever the directory service alert priority 64, the cybersecurity service 32 uses the directory service permission 20 to identify the abnormal directory service activity 84 that is most-deserving of network/computer/human resources. The cybersecurity service 32 may also identify other directory service permissions 20 that are lesser-deserving, or least-deserving, of network/computer/human resources (such as the normal directory service activity 80).

Figure 8:
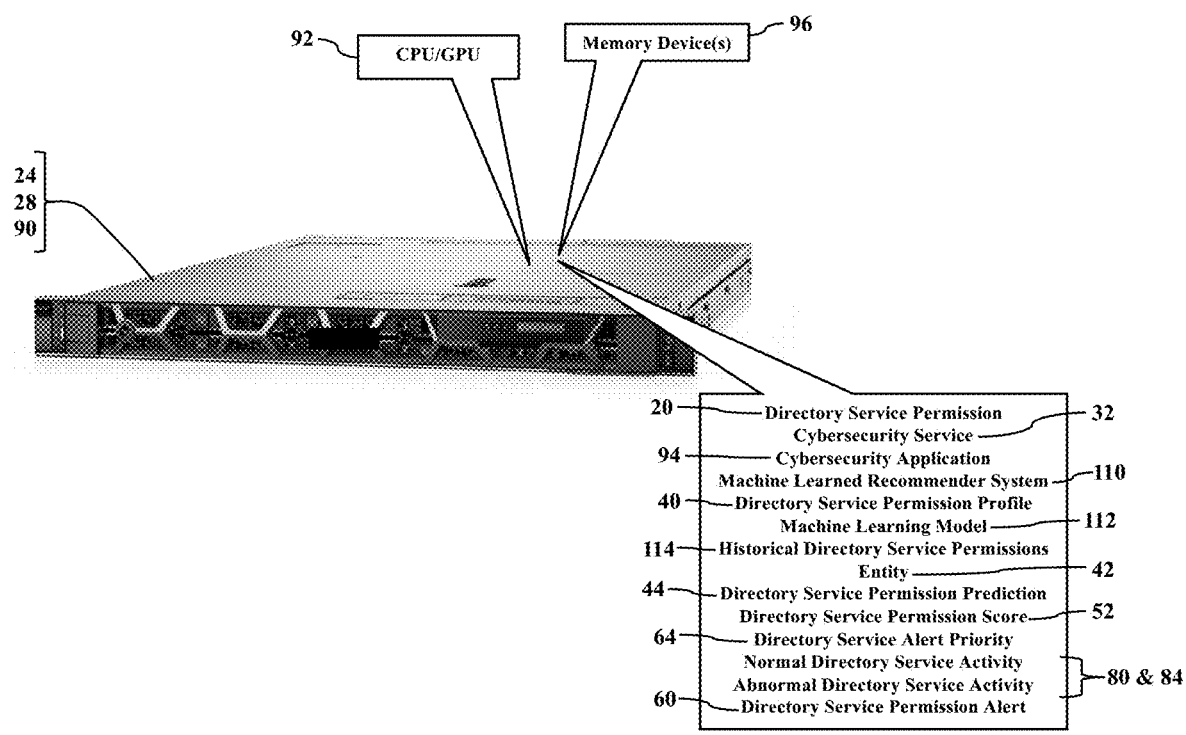
FIG. 8 illustrates examples of machine learning.

FIG. 8 illustrates examples of machine learning. The cybersecurity service 32 may use artificial intelligence and/or machine learning to assess the directory service permission 20. The cybersecurity application 94, for example, may instruct the server 28 (again illustrated as the rack server 90) to feed or send the new/different/changed directory service permission 20 to a machine learned recommender system 110. While the machine learned recommender system 110 may be a remote network resource, FIG. 8 illustrates a simple example of local resourcing. The machine learned recommender system 110 may be locally stored in the memory device 96. When the rack server 90 receives the directory service permission 20, the cybersecurity application 94 may instruct or cause the rack server 90 to send the directory service permission 20 to the machine learned recommender system 110 for assessment. The machine learned recommender system 110, for example, may be a module or service that compares the new/different/changed directory service permission 20 to the directory service permission profile 40. Here, though, the directory service permission profile 40 is generated by the machine learned recommender system 110. The machine learned recommender system 110 uses a machine learning model 112 that is trained using current and/or historical directory service permissions 114 associated with the entity 42. That is, the entity's/customer's own directory service data (such as the historical directory service permissions 114) is used to create and/or to tune the machine learning model 112 and/or the directory service permission profile 40. The machine learned recommender system 110 uses the machine learning model 112 to generate the directory service permission prediction 44.

The machine learned recommender system 110 generates outputs. The machine learned recommender system 110 compares the new/different/changed directory service permission 20 to the directory service permission profile 40 generated using the machine learning model 112. The machine learned recommender system 110, in particular, may compare the new/different/changed directory service permission 20 to the directory service permission prediction 44. The cybersecurity service 32 may then generate the directory service permission score 52 and/or the directory service alert priority 64, based on how well the directory service permission 20 agrees/disagrees with the directory service permission prediction 44. The machine learned recommender system 110, for example, may predict that the new/different/changed directory service permission 20 is normal/harmless directory service activity 80 or abnormal directory service activity 84, based on the directory service permission score 52 and/or the directory service alert priority 64. Once the directory service permission score 52, the directory service alert priority 64, and/or the directory service permission prediction 44 is/are generated, the machine learned recommender system 110 may send those values/data back to the cybersecurity application 94 for subsequent processing. The cybersecurity application 94, as examples, may generate and send the directory service permission alert 60 reflecting the score 52, priority 64, and/or prediction 44 (such as explained with reference to FIGS. 1-7).

The directory service permission profile 40, as examples, defines or specifies harmless and unusual directory service activity. The directory service permission profile 40 may describe the historical directory service permissions 114 that have been prioritized, categorized, assessed, and/or analyzed as the normal/harmless directory service activity 80. The directory service permission profile 40, in other words, may describe the directory service permissions 20 associated with normal or harmless directory service activities. The directory service permissions 20 may thus represent current and/or historical information, data, bits/bytes, and/or other electronic content that is/are known to indicate normal/harmless directory service activity 80 (such as the directory service permissions 20, the directory service permission scores 52, and/or the directory service alert priorities 64). Whatever information or data is represented by the directory service permission 20, that information or data may be compared to the directory service permission profile 40 (such as the directory service permission prediction 44). If the electronic content represented by the directory service permission 20 equals, matches, satisfies, lies within, or conforms to the directory service permission profile 40 (such as the threshold ranges explained with reference to FIG. 4), then machine learned recommender system 110 may determine the directory service permission score 52 and/or the directory service alert priority 64. The machine learned recommender system 110, for example, may predict that the new/different/changed directory service permission 20 is normal/harmless directory service activity 80, based on the directory service permission score 52 and/or the directory service alert priority 64 as revealed by the directory service permission profile 40. The machine learned recommender system 110, however, may predict that the new/different/changed directory service permission 20 is abnormal directory service activity 84, based on the directory service permission score 52 and/or the directory service alert priority 64.

The cybersecurity service 32 again improves computer functioning. The cybersecurity service 32 detects abnormal directory service activity 84 that may signal a cybersecurity data breach. The cybersecurity service 32, for example, tracks privilege escalation against privileged objects, such as changes involving administrative roles. The cybersecurity service 32 also detects new takeover-like permission (i.e., the ability to reset another object's password, the ability to add another object to a group, the ability to modify an object's permissions, the ability to modify an object's user account control attribute) against a privileged object. Moreover, the cybersecurity service 32 scores and prioritizes directory service data (such as the directory service permission 20 and the directory service alert priority 64). The cybersecurity service 32 also issues the informational-level directory service permission alert 60 specifying the directory service alert priority 64. The cybersecurity service 32 thus notifies of directory service changes informed by how surprising or unpredicted the detected change is. For example, it is not very surprising for some administrative account to be granted the ability to reset another non-admin account's password; however, the converse is quite surprising. The cybersecurity service 32 learns the underlying latent structure of the permissions in the directory service. The cybersecurity service 32 thus uses the underlying latent structure to predict which permissions entities 42 should or should not have. If the machine learning model 112 used by the machine learned recommender system 110 is sufficiently accurate and precise, then the residual error between the observed state of the permission and the predicted state of the permission can serve as a measure of anomalousness. The cybersecurity service 32 may thus use the machine learning model 112 to determine if a determine if a novel take-over-like permission which the model 112 predicts the entity 42 ought not have, then the directory service permission alert 60 would be more severe (i.e., higher/greater directory service alert priority 64).

FIGS. 9-12 illustrate more detailed examples of the machine learned recommender system 110. FIG. 9, for example, illustrates a directory services permission table 120. The directory services permission table 120 contains directory service data that is retrieved from, or sent by, the directory service 22 (illustrated in FIGS. 1-3 & 5-6). The cybersecurity service 32 may have a matrix generator algorithm (not shown for simplicity) that arranges the directory service data into one or more matrices, depending on usage. The cybersecurity service 32 may then provide the matrices to the machine learned recommender system 110. While the directory services data is ordinarily very rich with detailed information describing many different users/devices/applications/services/entities 42, FIG. 9 only illustrates a simple sample. Each user (i.e., entity 42) represents a row in the directory services permission table 120, and each current directory service permission 20 represents a column. If a user has a given directory service permission 20, then the database cell/entry where the user index and permission index meet has a value of one (1). Otherwise, if the user does not have the directory service permission 20, then the database cell/entry has a value of zero (0). Again, FIG. 9 only illustrates a simple sample for four (4) users (e.g., Jake, Horacio, Becky, and Yinghao). The machine learned recommender system 110, by applying the machine learning model 112, is able to learn the latent structure in tables like the directory services permission table 120 (as explained with reference to FIG. 8).

FIG. 10 illustrates the directory service permission predictions 44. The machine learned recommender system 110, for example, may generate a directory services prediction table 122 specifying the directory service permission prediction 44 for each user/entity 42. As the directory services prediction table 122 shows, the machine learned recommender system 110, by applying the machine learning model 112 to generate the directory service permission profile 40, predicts higher values for those elements of the table where the directory service permissions 20 do truly exist. The cybersecurity service 32 may thus generate the continuous model predictions (such as between 0 and 1) are compared to the directory service permission 20 (e.g., the binary predictions of 0 or 1, as explained with reference to FIG. 9).

FIG. 11 illustrates matrix operations. The machine learned recommender system 110 generates the directory service permission predictions 44 by using the trained machine learning model 112 based on the Single Value Decomposition (or SVD) algorithm. The machine learned recommender system 110 uses partial SVD to construct a recommender engine for the permission matrix (i.e., the directory services permission table 120 illustrated in FIG. 9). The SVD is partial because the column dimension of the U matrix is not equal to the row dimension of the M matrix, and the row dimension of the V* matrix is not equal to the column dimension of the M matrix. This row/column inequality means that only a subset of singular values are selected. While partial SVD has uses for compression, here the cybersecurity service 32 may use SVD to learn a latent representation of the entity's permission matrix (i.e., the directory services permission table 120). The underlying factors which are learned correspond to entities, items, and their interactions. The machine learned recommender system 110, by learning the latent structure of the M matrix, may either make predictions about missing elements of M or evaluate permission changes as being likely or unlikely.

Figure 12:
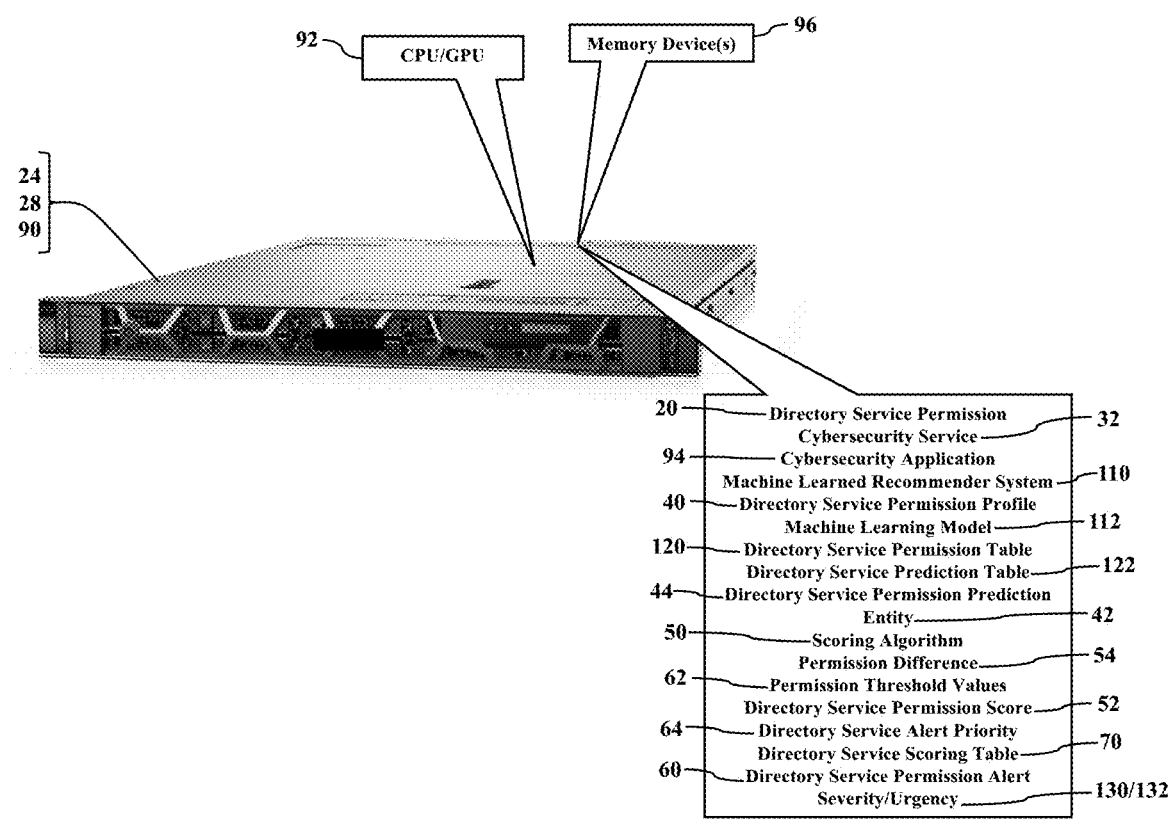

FIG. 12 illustrates scoring schemes. FIG. 12 again illustrates the rack server 90 operating or functioning as the machine learned recommender system 110. The rack server 90, for example, is programmed to apply the machine learning model 112 and to generate the directory services permission table 120. The rack server 90 is also programmed to use the partial SVD technique to construct the directory services prediction table 122 specifying the directory service permission prediction 44 for each user/entity 42. So, once the directory service permission prediction 44 is generated, the machine learned recommender system 110 may compare the recent new/different/changed directory service permission 20 to the directory service permission prediction 44. The machine learned recommender system 110, the machine learning model 112, and/or the cybersecurity application 94 may read the entity's directory service permission prediction 44 from the tabular entry in the directory services prediction table 122. The machine learned recommender system 110, the machine learning model 112, and/or the cybersecurity application 94 may then execute the scoring algorithm 50. Again, while the scoring algorithm 50 may reflect whatever objective is desired, the cybersecurity service 32 may determine the permission difference 54 between the recent new/different/changed directory service permission 20 and the directory service permission prediction 44. Once the permission difference 54 is determined, the permission difference 54 may then be compared to the one or more permission threshold values 62. Each permission threshold value 62, for example, may represent a different directory service permission score 52 and/or directory service alert priority 64. So, when the rack server 90 determines the permission difference 54, the rack server 90 may also determine the directory service permission score 52 and the directory service alert priority 64 (such as by using database lookups to the directory service scoring table 70, as explained with reference to FIG. 4). The server 28 may thus send the directory service permission alert 60, and the directory service permission alert 60 is prioritized according to the directory service alert priority 64. The directory service permission alert 60, in other words, may have a severity 130 or urgency 132 based on the permission difference 54 between the directory service permission 20 and the directory service permission prediction 44.

The cybersecurity service 32 may implement scoring ranges. In these examples, the permission difference 54 determines the directory service permission score 52 and the directory service alert priority 64. The permission difference 54 measures the value distance (i.e., agreement or disagreement) between the recent or requested new/different/changed directory service permission 20 and the historically-based directory service permission prediction 44. If the permission difference 54 is small or low, for example, then perhaps the directory service permission 20 and the directory service permission prediction 44 have nearly equal values and strongly agree. The directory service permission 20, in other words, resembles or matches what is predicted by the directory services prediction table 122. The directory service permission score 52 may thus have a value that represents this agreement. Conversely, if the permission difference 54 is large or high, then perhaps the directory service permission 20 and the directory service permission prediction 44 have unequal values and strongly disagree. The directory service permission 20 does not sufficiently resemble what is predicted by the machine learning model 112 (such as the directory services prediction table 122). The directory service permission score 52 may thus have different values that represent varying ranges of agreement and disagreement.

Scoring ranges may be used. When the rack server 90 computes the permission difference 54 between the directory service permission 20 and the directory service permission prediction 44, the rack server 90 may compare the permission difference 54 to one or more permission threshold values 62. Each permission threshold value 62 may represent a different directory service permission score 52 and/or a different directory service alert priority 64. Once the rack server 90 determines the permission difference 54, the rack server 90 may also determine the corresponding directory service permission score 52 and the directory service alert priority 64. The rack server 90 may thus send the directory service permission alert 60, and the directory service permission alert 60 specifies the severity 130 or urgency 132 according to the directory service alert priority 64. Whatever the notification network addresses 72, for example, the directory service permission alert 60 notifies downstream services and/or personnel of the new/different/changed directory service permission 20. The directory service permission alert 60, though, also notifies the recipients of the corresponding directory service permission score 52 and/or the directory service alert priority 64. The recipients may thus use the directory service permission alert 60 to arrange and manage workloads. High scoring, high priority permission alerts 60, for example, may require urgent computer resources and/or human review 74. Low scoring, low priority permission alerts 60, however, may be deferred and queued for later action.

Figure 13:
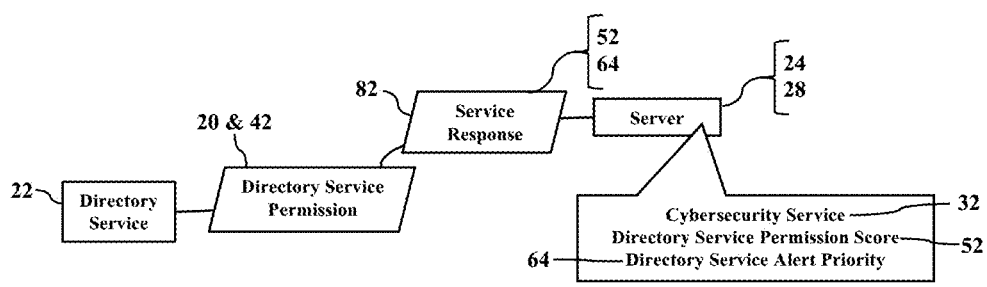
FIG. 13 illustrates examples of directory service authorization or denial.

FIG. 13 illustrates more examples of permission authorization or denial. When the directory service 22 receives, stores, or is otherwise notified of the new/different/changed directory service permission 20 associated with the entity 42, the directory service 22 may stop, terminate, or pause processing of the directory service permission 20. The directory service 22, in other words, may not immediately implement the new/different/changed directory service permission 20. The directory service 22, instead, may suspend processing and request a verdict/decision from the cybersecurity service 32. The directory service 22 sends the new/different/changed directory service permission 20 to the cybersecurity service 32 and awaits, for example, the directory service permission score 52 and/or the directory service alert priority 64.

The cybersecurity service 32 may approve or deny the directory service activity. The cybersecurity service 32, for example, generates and sends the directory service permission score 52 and/or the directory service alert priority 64 back to the directory service 22. When the directory service 22 receives the service response 82 from the cybersecurity service 32, the directory service 22 may proceed with the new/different/changed directory service permission 20. When, for example, the directory service permission score 52 and/or the directory service alert priority 64 indicate that the new/different/changed directory service permission 20 agrees with what is predicted or expected directory service activity (e.g., the permission difference 54 is small or low), then the directory service 22 may be configured to automatically approve and implement the normal directory service activity 80 (such as the new/different/changed directory service permission 20). When, however, the directory service permission score 52 and/or the directory service alert priority 64 indicate unpredicted or unexpected directory service activity (e.g., the permission difference 54 is large or high), then the directory service 22 may be configured to automatically deny abnormal directory service activity 84 (and thus the new/different/changed directory service permission 20). The cybersecurity service 32 thus guards against directory service activity that may indicate a cybersecurity attack.

The machine learned recommender system 110 thus automates directory service management. A typical directory service may have hundreds, thousands, or even millions of different entities 42 and their permissions 20. The machine learned recommender system 110 may index the entities 42 (such as the users) and their permissions 20 as row/column entries (as illustrated in FIG. 9). The machine learned recommender system 110 may thus track current permissions 20 (e.g., X, Y, Z) and then quickly and easily assess the new/different/changed directory service permission (e.g., D). The machine learned recommender system 110 determines whether directory service activity is expected/predicted or surprising. The machine learned recommender system 110 determines if the new/different/changed directory service permission 20 fits the machine learning model 112. That is, when the new/different/changed directory service permission 20 is tested on elements/entries in the directory services prediction table 122 never seen during training, the machine learned recommender system 110 determines agreement/disagreement with the directory service permission prediction 44? If the new/different/changed directory service permission 20 and the directory service permission prediction 44 sufficiently agree, then machine learned recommender system 110 has learned the underlying structure of the directory services permission table 120. If, however, the new/different/changed directory service permission 20 and the directory service permission prediction 44 disagree, then the directory service permission score 52 directory service alert priority 64 may reflect the disagreement. The machine learned recommender system 110 thus compares current directory service activity or reality to the directory service permission prediction 44.

The machine learned recommender system 110 may also find mispermissions. The machine learned recommender system 110 may inspect current permissions 20 (such as the entries in the directory services permission table 120). The machine learned recommender system 110 may also generate the directory services prediction table 122. The machine learned recommender system 110 may then compare the entity's permission(s) 20 in the directory services permission table 120 to the entity's corresponding directory service permission prediction(s) 44 in the directory services prediction table 122. The machine learned recommender system 110 may determine the permission difference 54 and determine the directory service permission score 52 and the directory service alert priority 64. The machine learned recommender system 110 may thus hunt for aberrant, mispermissions by periodically or randomly reviewing current permissions 20 with predicted permissions 44.

The cybersecurity service 32 improves computer functioning by detecting abnormal directory service activity 84. The rack server 90, for example, detects surprising, anomalous directory service activity. The cybersecurity service 32 increases the severity/urgency 130/132 of the directory service permission alert 60, when warranted. The cybersecurity service 32, for example, delivers privilege escalation alerts 60 with increased severity/urgency 130/132 when new permissions 20 are detected against highly-privileged entities 42. The machine learning model 112 learns which new/different/changed directory service permissions 20 are more/less surprising. The cybersecurity service 32 may then increase the severity/urgency 130/132 of the directory service permission alert 60 when the detected permission change against a privileged entity 42 is more surprising. Those new/different/changed directory service permissions 20 which are deemed less surprising or expected can retain informational-level alert severity. For example, an admin may be granted the ability to reset another admin's password, and such a change is not very surprising. However, if a low-level user from a non-IT business function (such as accounting) is given the same access, then the severity/urgency 130/132 should be high. New permissions against privileged entities 42, in other words, generate the directory service permission alert 60 with the severity/urgency 130/132 that is proportional to the level of surprise of the new permission. The cybersecurity service 32, for example, may score a user's, or a group's, take-over-like permissions by how surprising they collectively are, in the context of all users.

The cybersecurity service 32 further improves computer functioning. Having directory service permission alerts 60 with the appropriate level of severity/urgency 130/132 may be important for building chains of detections. For example, it is likely not surprising for a user to authenticate to a server to which the account has never previously authenticated. However, if that authentication is also accompanied by a surprising permission change, perhaps a permission change which granted access to that server, then perhaps these two events together warrant the creation of a potential incident with higher severity/urgency 130/132. The general idea is that one can build better response playbooks when one's detections/alerts 20 have the appropriate level of severity.

Figure 14:
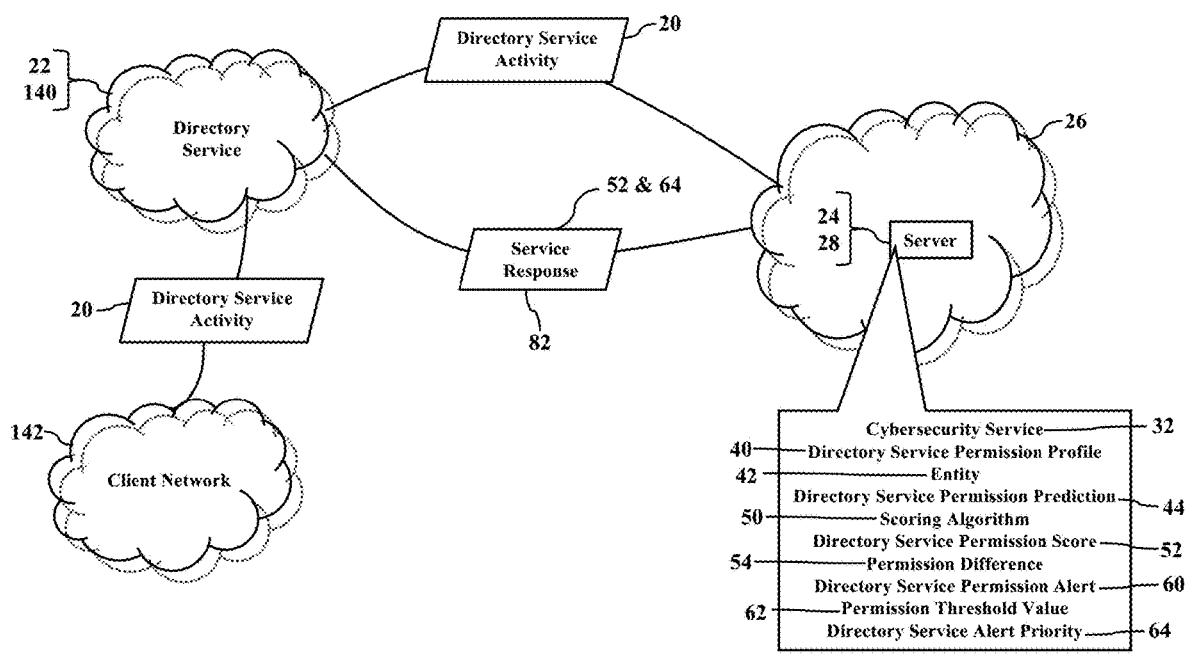
FIG. 14 illustrates examples of cloud service monitoring.

FIG. 14 illustrates examples of cloud service monitoring. Here the directory service 22 and the cybersecurity service 32 may have a third party, customer/client, supplier/subcontractor relationship. In FIG. 14, for example, the directory service 22 is a cloud service provided by a directory service cloud computing environment 140 to a customer/client network 142. The directory service 22, though, subscribes to the cybersecurity service 32 provided by the service provider and the cloud computing environment 26. When a computer operating within the customer/client network 142 attempts or requests the new/different/changed directory service permission 20, the computer operating within the customer/client network 142 sends the new/different/changed directory service permission 20 internetwork to the external/remote directory service cloud computing environment 140 providing the directory service 22. When the directory service 22 receives the request for the new/different/changed directory service permission 20, the directory service 22 may first request cybersecurity service 32. That is, the directory service 22 may not immediately implement the new/different/changed directory service permission 20. The directory service 22, instead, may suspend processing and request a verdict/decision from the cybersecurity service 32. The directory service 22 may send the new/different/changed directory service permission 20 internetwork to the external/remote cybersecurity service 32 provided by the service provider and the cloud computing environment 26. The directory service 22, in other words, outsources the cybersecurity service 32 to distinguish between legitimate directory service activities and cyberattacks.

The cloud computing environment 26 performs the cybersecurity service 32. Again, for simplicity, FIG. 14 illustrates the server 28 providing the cybersecurity service 32. The server 28 assesses new/different/changed directory service permission 20 sent from the requesting service client and determines the directory service permission score 52 and the directory service alert priority 64. The server 28 sends the service response 82 back to the directory service 22, and the service response 82 includes, specifies, or references the directory service permission score 52 and the directory service alert priority 64. When the directory service 22 receives the service response 82, the directory service 82 inspects the service response 82 and proceeds according to the directory service permission score 52 and/or the directory service alert priority 64. Simply put, if the new/different/changed directory service permission 20 represents normal directory service activity 80, then the directory service 22 may approve and implement the new/different/changed directory service permission 20. If, however, the new/different/changed directory service permission 20 represents abnormal directory service activity 84, then the directory service 22 may deny and terminate the new/different/changed directory service permission 20.

Computer functioning is greatly improved. Malicious directory services activities ruin computer operations by elevating permission levels to hack data. The server 28 quickly identifies abnormal directory services activities to minimize damage to client device and to client data. Because the server 28 may utilize the machine learning model 112, the cybersecurity service 32 is fast and simple to execute. The server 28 need merely compare current directory services activities to predicted directory services activities. The directory service permission profile 40 consumes little space (in bits/bytes) in the memory device 96. Moreover, because range comparisons may be simple logical statements, the hardware processor 92 requires less cycles and less time to manage directory services activities. Computer resources are reduced, and less electrical power is required to test for legitimate directory services activities. The cybersecurity service 32 is thus fast and simple, allowing the server 28 to quickly assess the thousands or millions of directory service activities requested each day/week. The cybersecurity service 32 thus greatly improves computer functioning of the server 28 when detecting abnormal directory service activities.

Figure 15:
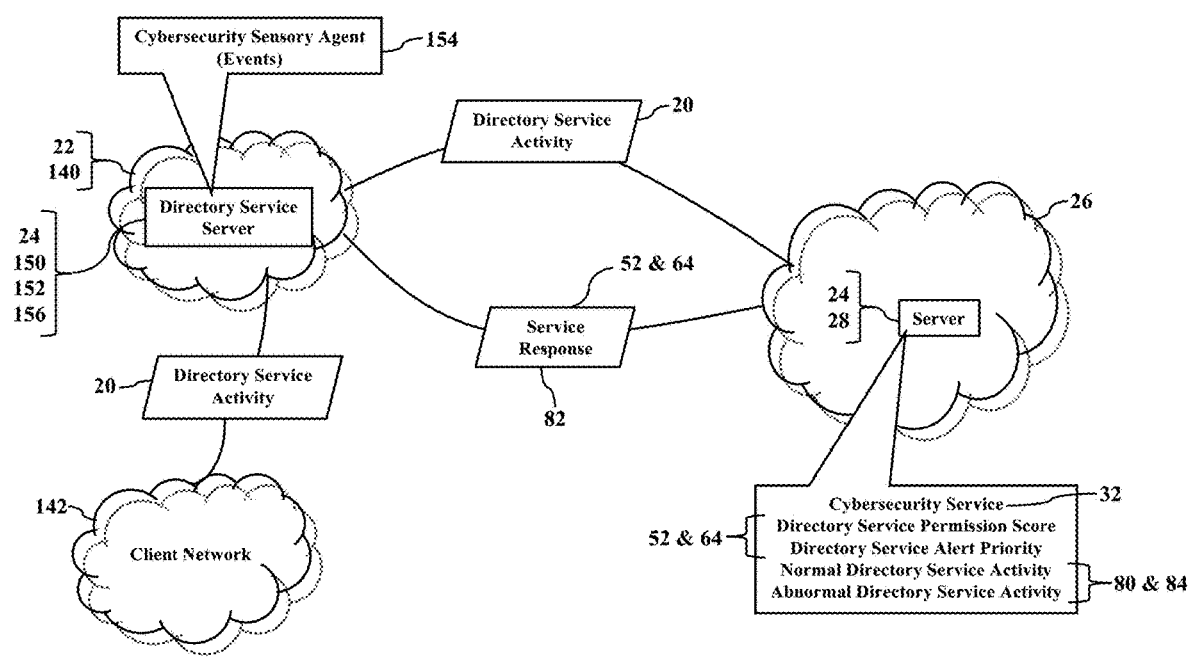
FIGS. 15-16 illustrate examples of host monitoring.
Figure 16:
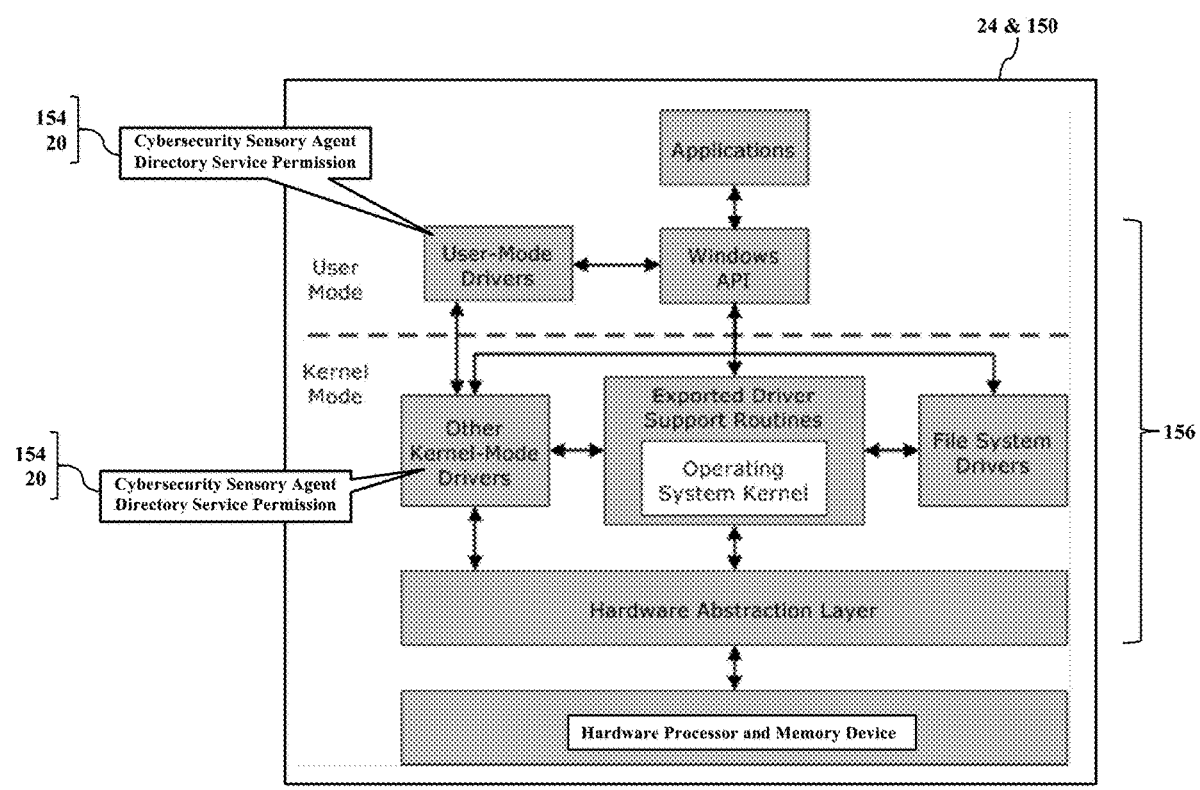

FIGS. 15-16 illustrate examples of host monitoring. The cybersecurity service 32 may serve and protect other computer systems 24 (such as client devices 150) from abnormal directory service activities 84. Let's assume, for example, that a directory service server 152 provides the directory service 22 to the client network 142. An IT administrator registers directory service server 152 for the cybersecurity service 32. The IT administrator, in other words, enrolls the directory service server 152 as a subscriber to the cybersecurity service 32. When the directory service server 152 receives a directory service request (such as the new/different/changed directory service permission 20), the directory service server 152 may first request cybersecurity service 32. That is, the directory service server 152 may not immediately implement the new/different/changed directory service permission 20. The directory service server 152, instead, may suspend processing and request a verdict/decision from the cybersecurity service 32. The directory service server 152, in other words, outsources the directory service request (such as the new/different/changed directory service permission 20) to the cybersecurity service 32. The cybersecurity service 32 monitors the directory service 22 for abnormal directory service activities 84 that may represent data breaches and other cyberthreats.

The directory service server 152 may alert the cloud computing environment 22. Because the directory service server 152 subscribes to the cybersecurity service 32, the directory service server 152 may download, store, and execute an endpoint cybersecurity sensory agent 154. The cybersecurity sensory agent 154 includes computer program, code, or instructions that scan and monitor its corresponding host (e.g., the directory service server 152) for events, communications, processes, activities, behaviors, data values, contexts, and/or patterns that indicate evidence of directory service activities (such as the new/different/changed directory service permission 20). The cybersecurity sensory agent 154, for example, interfaces with the host's operating system 156 to establish OS event notifications of hardware and software events related to the directory service 22. Should the event notifications indicate that the directory service 22 is being called/downloaded/requested/stored/processed, the cybersecurity sensory agent 154 instructs the host's operating system 156 to generate a request for the cybersecurity service 32.

The cybersecurity service 32 evaluates the directory service 22. The cybersecurity sensory agent 154, for example, may forbid or limit processing/execution of the directory service activities prior to the cybersecurity service 32. That is, prior to implementing the new/different/changed directory service permission 20, the endpoint cybersecurity sensory agent 154 may instruct the host's operating system 156 to perform only limited preprocessing or reading of the directory service activity. The cybersecurity sensory agent 154, as an example, may cooperate with the operating system 156 to send the requested directory service activity (such as the new/different/changed directory service permission 20) to the network address (e.g., IP address) associated with the cloud computing environment 26 and/or the cybersecurity service 32. The cybersecurity sensory agent 154 may then instruct the operating system 156 to await further instructions or authorization.

The server 28 is programmed to provide at least a portion of the cybersecurity service 32. When the cloud computing environment 26 receives the request for the cybersecurity service 32, the networked members 30 (illustrated in FIGS. 1-3) of the cloud computing environment 26 may then route, forward, or send the byte content representing the requested directory service activity (such as the new/different/changed directory service permission 20) to the server 28 for analysis. The server 28, for example, assesses requested directory service activity and determines the directory service permission score 52 and the directory service alert priority 64. The server 28 sends the service response 82 back to the directory service 22 (such as the IP address assigned to the directory service server 152 hosting the cybersecurity sensory agent 154). When the directory service server 152 receives the service response 82, the host's operating system 156 notifies the endpoint cybersecurity sensory agent 154. The endpoint cybersecurity sensory agent 154 reads the service response 82 blocks or allows the requested directory service activity (such as the new/different/changed directory service permission 20), based on the directory service permission score 52 and the directory service alert priority 64. As simple examples, if the new/different/changed directory service permission 20 represents normal directory service activity 80, then the endpoint cybersecurity sensory agent 154 may approve and instruct the operating system 156 to implement the new/different/changed directory service permission 20. If, however, the new/different/changed directory service permission 20 represents abnormal directory service activity 84, then the cybersecurity sensory agent 154 may deny and instruct the operating system 156 to block/terminate/fail/disregard the new/different/changed directory service permission 20.

The cybersecurity service 32 may assess directory service activities using neural networks. A neural network (such as the cloud computing environment 26) is a method in artificial intelligence that teaches computer systems (such as the server 28 and the networked members 30) to process data in a way that is inspired by the human brain. The neural network is a type of machine learning (such as deep learning) that uses interconnected computer nodes or neurons (such as the networked members 30 illustrated in FIGS. 1-3) in a layered structure that resembles the human brain. The neural network creates an adaptive system that computers use to learn and to continuously improve. Artificial neural networks attempt to solve complicated problems (such as the cybersecurity service 32) with accuracy.

The cybersecurity sensory agent 154 monitors the client device 150. The cybersecurity sensory agent 154 interfaces with the operating system 156 executed by the client device 150. The cybersecurity sensory agent 154 is a software application or program code stored in the memory device of the client device 150 and executed by the hardware processor operating within the client device 150. The cybersecurity sensory agent 154 may thus have permissions to monitor kernel-level directory service activities and/or user-mode directory service activities associated with the client device 150. Should the cybersecurity sensory agent 154 detect directory service activities, the cybersecurity sensory agent 154 cooperates with the operating system 156 to report the directory service activities to the cloud computing environment 26 (as above explained).

Figure 17:
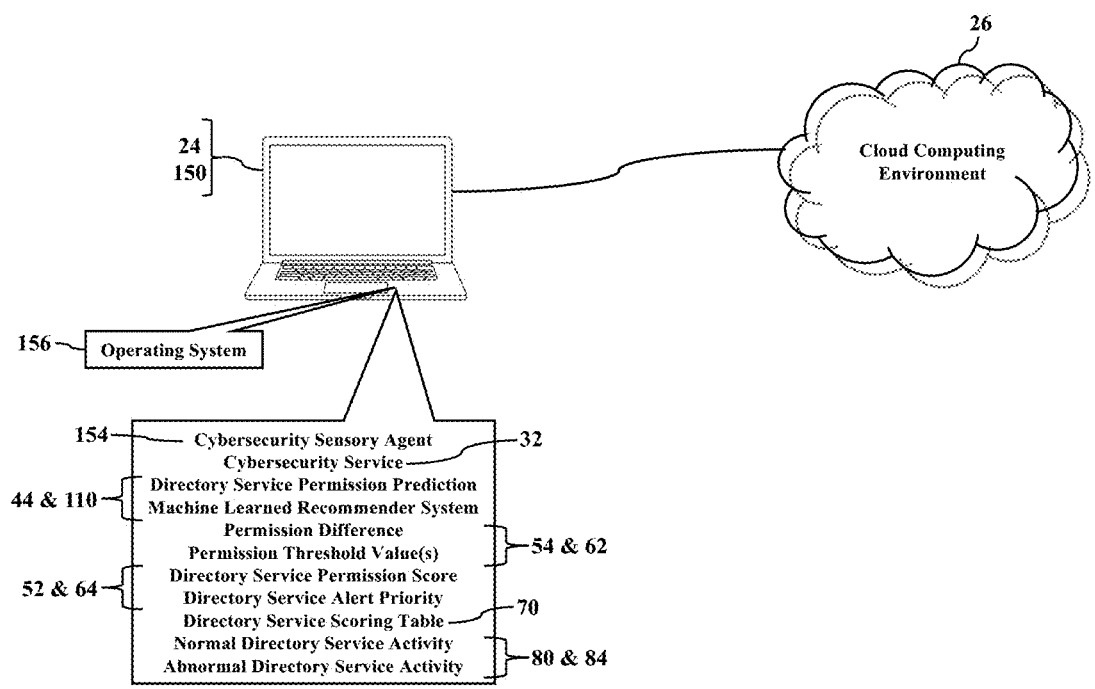
FIG. 17 illustrates some examples of local directory service assessment.

FIG. 17 illustrates some examples of local assessment. When the endpoint cybersecurity sensory agent 154 (installed to the client device 150) detects directory service activity (such as the new/different/changed directory service permission 20), the cybersecurity sensory agent 154 may generate and report the directory service activity to the cloud computing environment 26 (as explained with reference to FIG. 15). The cybersecurity sensory agent 154, however, may locally assess the directory service activity and locally determine the directory service permission score 52 and the directory service alert priority 64. The endpoint cybersecurity sensory agent 154, in other words, may locally conduct and provide the cybersecurity service 32 with little, or no, reliance on the cloud computing environment 26. The cybersecurity sensory agent 154 may again cooperate with the operating system 156 and acquire requested directory service activity (such as the new/different/changed directory service permission 20). The cybersecurity sensory agent 154 may generate the directory service permission prediction 44 (perhaps by using the machine learned recommender system 110). The cybersecurity sensory agent 154 may determine the permission difference 54 between the directory service permission 20 and the directory service permission prediction 44. The cybersecurity sensory agent 154 may compare the permission difference 54 to the permission threshold value(s) 62. The cybersecurity sensory agent 154 may generate the directory service permission score 52 and/or the directory service alert priority 64 (perhaps by storing and querying the directory service scoring table 70). The endpoint cybersecurity sensory agent 154 may then block or allow the requested directory service activity (such as the new/different/changed directory service permission 20), based on the directory service permission score 52 and the directory service alert priority 64. Simply put, if the new/different/changed directory service permission 20 represents normal directory service activity 80, then the cybersecurity sensory agent 154 may approve and implement the new/different/changed directory service permission 20. If, however, the new/different/changed directory service permission 20 represents abnormal directory service activity 84, then the cybersecurity sensory agent 154 may deny and terminate the new/different/changed directory service permission 20.

Figure 18:
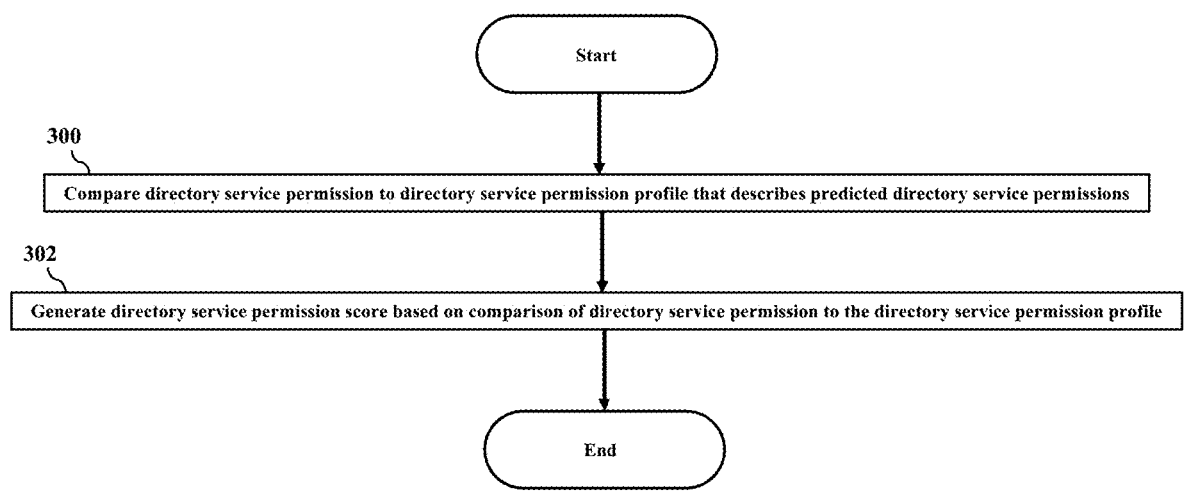
FIGS. 18-20 illustrate examples of methods or operations that assess directory service activities.

FIG. 18 illustrates examples of a method or operations executed by the computer system 24 that scores directory service activity (such as the directory service permission 20). The computer system 24 compares the directory service permission 20 to the directory service permission profile 40 that describes predicted directory service permissions (such as the directory service permission prediction 44) (Block 300). The computer system 24 generates the directory service permission score 52 associated with the directory service permission 20 based on the comparing of the directory service permission 20 to the directory service permission profile 40 that describes the predicted directory service permissions (Block 302).

Figure 19:
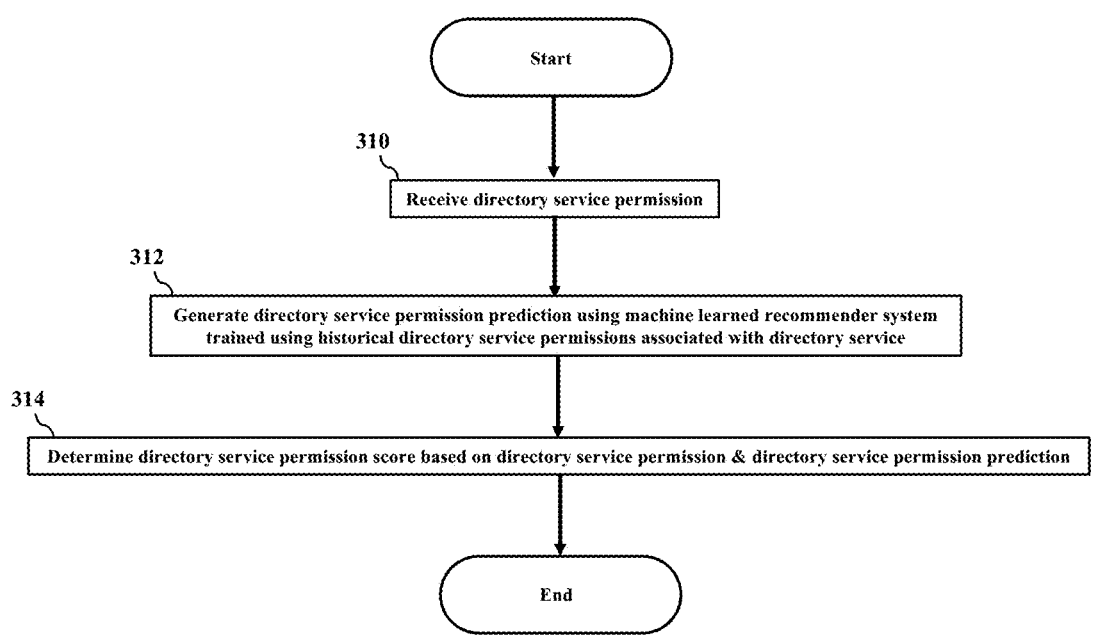

FIG. 19 illustrates examples of another method or operations that score the directory service permission 20. The directory service permission 20 is received (Block 310). The directory service permission prediction 44 is generated using the machine learned recommender system 110 trained using the historical directory service permissions 114 associated with the directory service 22 (Block 312). The directory service permission score 52 is determined based on the directory service permission 20 and the directory service permission prediction 44 (Block 314).

Figure 20:
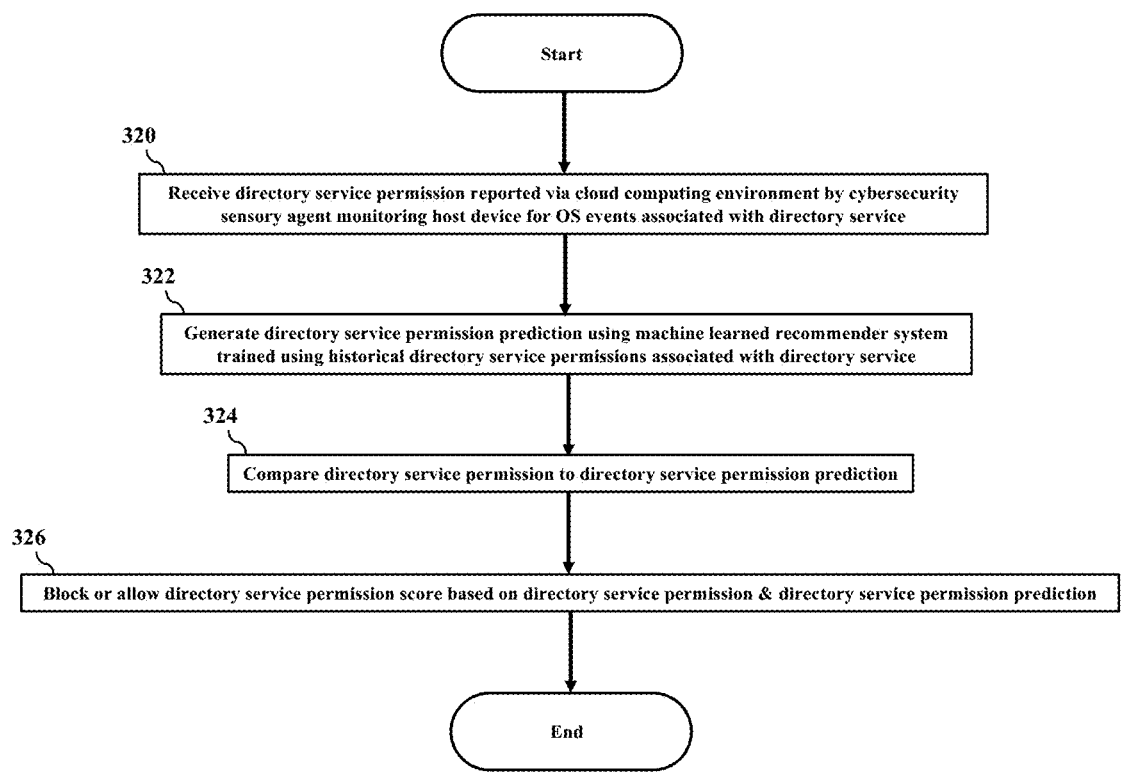

FIG. 20 illustrates examples of still more method or operations that score the directory service permission 20. The directory service permission 20 is received that was reported via the cloud computing environment 26 by the cybersecurity sensory agent 154 monitoring the host device 24/150 for the operating system events associated with the directory service 22 (Block 320). The directory service permission prediction 44 is generated using the machine learned recommender system 110 trained using the historical directory service permissions 114 associated with the directory service 22 (Block 322). The directory service permission 20 is compared to the directory service permission prediction 44 (Block 324). The directory service permission 20 is blocked or allowed based on the comparison of the directory service permission 20 to the directory service permission prediction 44 (Block 326).

Figure 21:
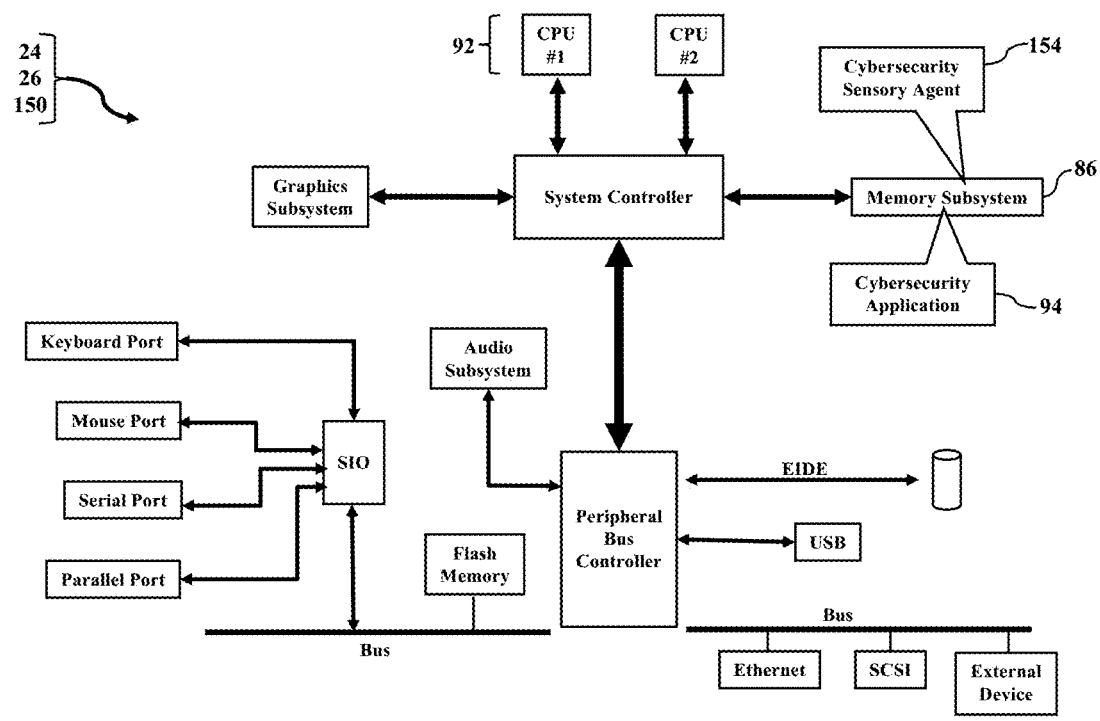
FIG. 21 illustrates a more detailed example of an operating environment.

FIG. 21 illustrates more detailed examples of the operating environment. FIG. 21 is a more detailed block diagram illustrating the computer system 24 and the client/host device 150. The cybersecurity application 94 and/or the endpoint cybersecurity sensory agent 154 is stored in the memory subsystem or device 96. One or more of the hardware processors 92 communicate with the memory subsystem or device 96 and execute the cybersecurity application 94 and/or the endpoint cybersecurity sensory agent 154. Examples of the memory subsystem or device 96 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and other read/write memory technology. Because the computer system 24 and the client device 150 is/are known to those of ordinary skill in the art, no detailed explanation is needed.

The computer system 24 and the client device 150 may have other embodiments. This disclosure mostly discusses the computer system 24 as the server 28 and the client device 150 as the directory service server 152. The cybersecurity service 32, however, may be easily adapted to other stationary or mobile computing examples, such as a desktop computer, a tablet computer, a smartwatch, and a network switch/router. The cybersecurity service 32 may also be easily adapted to other embodiments of smart devices, such as a television, an audio device, a remote control, and a recorder. The cybersecurity service 32 may also be easily adapted to still more smart appliances, such as washers, dryers, and refrigerators. Indeed, as cars, trucks, and other vehicles grow in electronic usage and in processing power, the cybersecurity service 32 may be easily incorporated into a vehicular controller.

The above examples of the cybersecurity service 32 may be applied regardless of the networking environment. The cybersecurity service 32 may be easily adapted to stationary or mobile devices having wide-area networking (e.g., 4G/LTE/5G/6G/7G cellular), wireless local area networking (WI-FIX), near field, and/or BLUETOOTH® capability. The cybersecurity service 32 may be applied to stationary or mobile devices utilizing any portion of the electromagnetic spectrum and a signaling standard (such as the IEEE 802 family of standards, GSM/CDMA/TDMA or other cellular standard, and/or the ISM band). The cybersecurity service 32, however, may be applied to a processor-controlled device operating in the radio-frequency domain and/or the Internet Protocol (IP) domain. The cybersecurity service 32 may be applied to a processor-controlled device utilizing a distributed computing network, such as the Internet (sometimes alternatively known as the "World Wide Web"), an intranet, a local-area network (LAN), and/or a wide-area network (WAN). The cybersecurity service 32 may be applied to a processor-controlled device utilizing power line technologies, in which signals are communicated via electrical wiring. Indeed, the many examples may be applied regardless of physical componentry, physical configuration, or communications standard(s).

The cybersecurity service 32 may utilize a processing component, configuration, or system. For example, the cybersecurity service 32 may be easily adapted to a desktop, mobile, or server central processing unit or chipset offered by INTEL®, ADVANCED MICRO DEVICES®, ARM®, APPLE®, TAIWAN SEMICONDUCTOR MANUFAC-TURING®, QUALCOMM®, or other manufacturer. The cybersecurity service 32 may even use multiple central processing units or chipsets, which could include distributed processors or parallel processors in a single machine or multiple machines. The central processing unit or chipset can be used in supporting a virtual processing environment. The central processing unit or chipset could include a state machine or logic controller. When any of the central processing units or chipsets execute instructions to perform "operations," this could include the central processing unit or chipset performing the operations directly and/or facilitating, directing, or cooperating with another device or component to perform the operations.

The cybersecurity service 32 may use packetized communications. When the computer system 24 or the client device 150 communicates via communications networks, information may be collected, sent, and retrieved. The information may be formatted or generated as packets of data according to a packet protocol (such as the Internet Protocol). The packets of data contain bits or bytes of data describing the contents, or payload, of a message. A header of each packet of data may be read or inspected and contain routing information identifying an origination address and/or a destination address.

The cybersecurity service 32 may utilize a signaling standard. The computer system 24, the client device 150, and/or the cloud computing environment 26 may mostly use wired networks to interconnect network members. However, the computer system 24, the client device 150, and/or the cloud computing environment 26 may utilize other communications devices using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or a variant of the GSM/CDMA/TDMA signaling standard. The cybersecurity service 32 may also utilize other standards, such as the I.E.E.E. 802 family of standards, the Industrial, Scientific, and Medical band of the electromagnetic spectrum, BLUETOOTH*, low-power or near-field, and other standard or value.

The cybersecurity service 32 may be physically embodied on or in a computer-readable storage medium. This computer-readable medium, for example, may include CD-ROM, DVD, tape, cassette, floppy disk, optical disk, USB flash memory drive, memory card, memory drive, and large-capacity disks. This computer-readable medium, or media, could be distributed to end-subscribers, licensees, and assignees. A computer program product comprises processor-executable instructions for assessing directory service activities, as the above paragraphs explain.

The diagrams, schematics, illustrations, and the like represent conceptual views or processes illustrating examples of assessing directory service activities. The functions of the various elements shown in the figures may be provided through the use of dedicated hardware as well as hardware capable of executing instructions. The hardware, processes, methods, and/or operating systems described herein are for illustrative purposes and, thus, are not intended to be limited to a particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A method executed by a computer system that scores a permission change request associated with a directory service permission, comprising:
    comparing, by the computer system, the permission change request associated with the directory service permission to a directory service permission profile that describes predicted directory service permissions associated with a directory service; and
    determining, by the computer system, whether the permission change request is suspicious by generating a directory service permission score based on the comparing of the permission change request to the directory service permission profile that describes the predicted directory service permissions.

2. The method of claim 1, further comprising prioritizing the permission change request based on the directory service permission score.

3. The method of claim 1, further comprising receiving the permission change request associated with the directory service permission.

4. The method of claim 1, further comprising generating a directory service permission prediction associated with the directory service permission.

5. The method of claim 4, further comprising comparing the directory service permission prediction to a threshold value.

6. The method of claim 4, further comprising determining a permission difference between the permission change request and the directory service permission prediction.

7. The method of claim 6, further comprising comparing the permission difference to a threshold value.

8. The method of claim 7, further comprising generating the directory service permission score based on the comparing of the permission difference to the threshold value.

9. A computer system that scores a permission change request associated with a directory service permission, comprising:
    at least one central processing unit; and
    at least one memory device storing instructions that, when executed by the at least one central processing unit, perform operations, the operations comprising:
    receiving the permission change request associated with the directory service permission and a directory service;
    generating a directory service permission prediction using a machine learned recommender system trained using directory service permissions associated with the directory service; and
    determining whether the permission change request is suspicious by generating a directory service permission score associated with the permission change request based on the directory service permission and the directory service permission prediction.

10. The computer system of claim 9, wherein the operations further comprise comparing the permission change request to the directory service permission prediction.

11. The computer system of claim 10, wherein the operations further comprise determining a permission difference between the permission change request and the directory service permission prediction.

12. The computer system of claim 11, wherein the operations further comprise generating the directory service permission score based on the permission difference.

13. The computer system of claim 11, wherein the operations further comprise comparing the permission difference to a threshold value.

14. The computer system of claim 13, wherein the operations further comprise generating the directory service permission score based on the comparing of the permission difference to the threshold value.

15. The computer system of claim 11, wherein the operations further comprise generating an alert having a severity based on the permission difference.

16. The computer system of claim 9, wherein the operations further comprise generating an alert based on the directory service permission score.

17. A memory device storing instructions that, when executed by at least one central processing unit, perform operations, comprising:
    receiving a directory service permission change request reported via a cloud computing environment by a cybersecurity sensory agent monitoring a host device for events associated with a directory service;
    generating a directory service permission prediction using a machine learned recommender system trained using directory service permissions associated with the directory service;
    determining whether the directory service permission change request is suspicious by comparing the directory service permission change request reported via the cloud computing environment by the cybersecurity sensory agent to the directory service permission prediction generated using the machine learned recommender system; and
    blocking or allowing the directory service permission change request based on the comparing of the directory service permission change request to the directory service permission prediction generated using the machine learned recommender system.

18. The memory device of claim 17, wherein the operations further comprise determining a permission difference between the directory service permission change request and the directory service permission prediction.

19. The memory device of claim 18, wherein the operations further comprise determining a directory service permission score associated with the directory service permission change request based on the permission difference.

20. The memory device of claim 18, wherein the operations further comprise determining a directory service permission score associated with the directory service permission change request by querying a database having an entry that associates a threshold value associated with the permission difference to the directory service permission score.

* * * * *